United States Patent
Cheng

(10) Patent No.: US 6,657,414 B1
(45) Date of Patent: Dec. 2, 2003

(54) TERMINAL DEVICE FOR A BATTERY CONTAINER ON AN ELECTROMOBILE

(75) Inventor: Ming-Chuan Cheng, Taichung (TW)

(73) Assignee: Merits Health Products Co., Ltd., Taichung (TW)

( * ) Notice: Subject to any disclaimer, the term of this patent is extended or adjusted under 35 U.S.C. 154(b) by 0 days.

(21) Appl. No.: 10/374,073

(22) Filed: Feb. 27, 2003

(51) Int. Cl.[7] .............................. H02J 7/00; H01M 2/10; H02G 3/00
(52) U.S. Cl. .................. 320/107; 320/104; 429/100; 307/10.1
(58) Field of Search ................... 320/107, 104, 320/110, 112, 113, 115; 429/96–99; 29/623.1, 623.2; D13/119; 180/68.5; 248/503; 307/10.1, 150, 9.1

(56) References Cited

U.S. PATENT DOCUMENTS 5,200,280 A * 4/1993 Karasa ..................... 429/99
6,023,146 A * 2/2000 Casale et al. ............... 320/112
6,218,043 B1 * 4/2001 Leung et al. ................ 429/99
6,399,239 B2 * 6/2002 Bolstad et al. .............. 429/100
6,455,190 B1 * 9/2002 Inoue et al. ................ 320/112
6,489,747 B2 * 12/2002 Abe ........................... 320/112

* cited by examiner

Primary Examiner—Pia Tibbits
(74) Attorney, Agent, or Firm—Varndell & Varndell, PLLC

(57) ABSTRACT

A terminal device secured between an electromobile and a battery container (50) consists of a body terminal contact (20) and a container terminal contact (40). The body terminal contact (20) is attached to the electromobile, and the container terminal contact (40) is attached to a cap (30) formed in the battery container (50) to conductively abut the body terminal contact (20) directly when the battery container (50) is mounted in the electromobile. Thereby, the battery container (50) can be quickly and easily attached to or detached from the electromobile.

6 Claims, 5 Drawing Sheets

US 6,657,414 B1

TERMINAL DEVICE FOR A BATTERY CONTAINER ON AN ELECTROMOBILE

BACKGROUND OF THE INVENTION

1. Field of the Invention

The present invention relates to a terminal device for a battery container, and more particularly to a terminal device for a battery container mounted on an electromobile, which can be engaged or disengaged quickly and easily.

2. Description of Related Art

Electromobiles are becoming popular because they use electricity as the power source and generate less pollution than normal means of personal transportation that use gasoline. Each electromobile carries a power supply system such as a battery container to provide electricity. Conventional connecting techniques between the electromobile and the battery container use wires attaching to terminals of the electromobile and the battery container to make the electrical connection. In such a connecting technique, the wires are usually impediments when the battery container is removed from the electromobile to charge the battery and are easily and inadvertently pulled off the terminals. Additionally, attaching the wires to each terminal is troublesome and time-consuming. Therefore, conventional connecting techniques for a battery container are inconvenient.

The present invention has arisen to mitigate or obviate the disadvantages of the conventional connecting technique between the electromobile and the battery container.

SUMMARY OF THE INVENTION

The main objective of the present invention is to provide a terminal device for a battery container on an electromobile, which is easily connected or disconnected.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
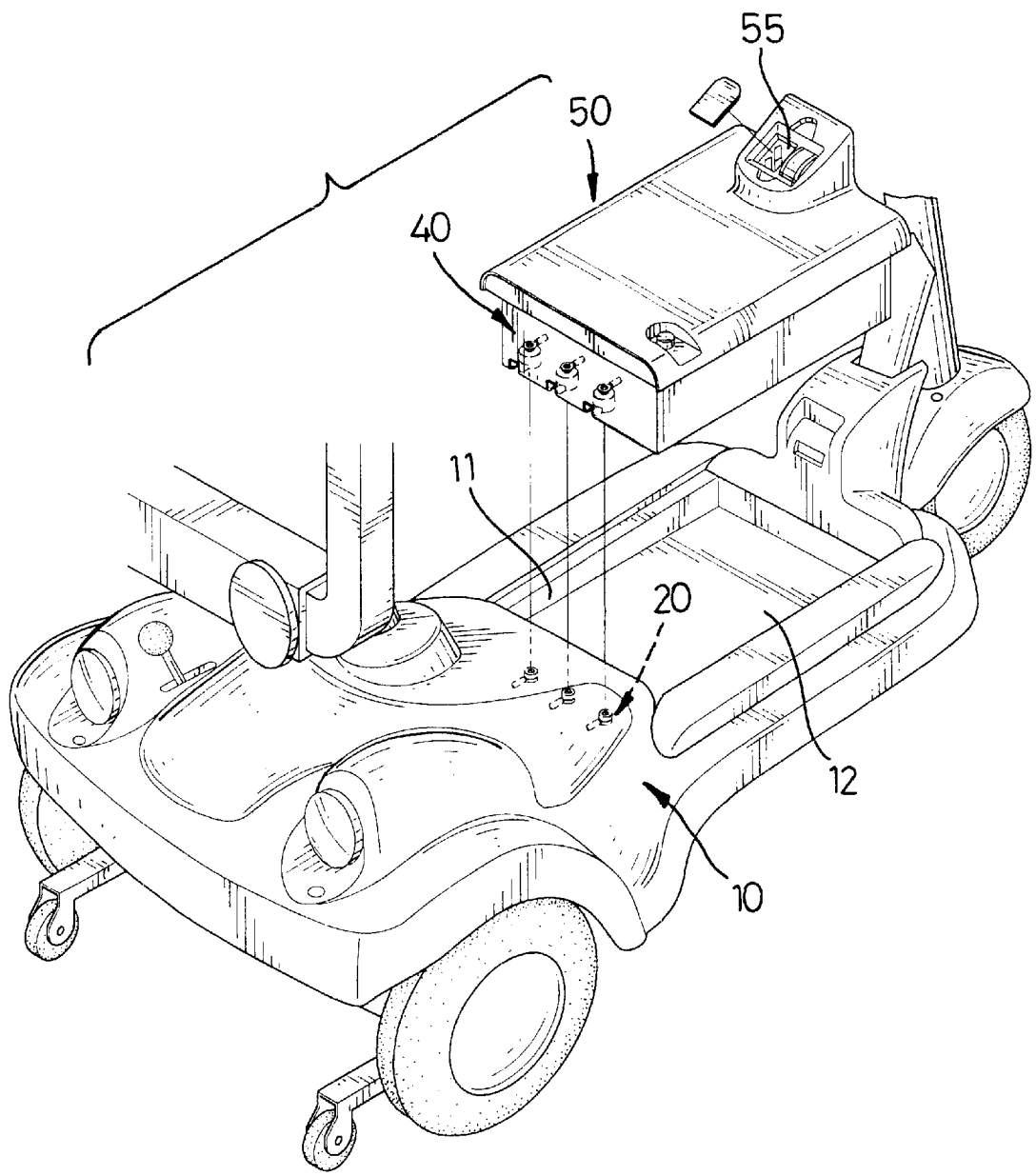
FIG. 1 is an exploded perspective view of a battery container and an electromobile with multiple terminal devices in accordance with the present invention.
Figure 2:
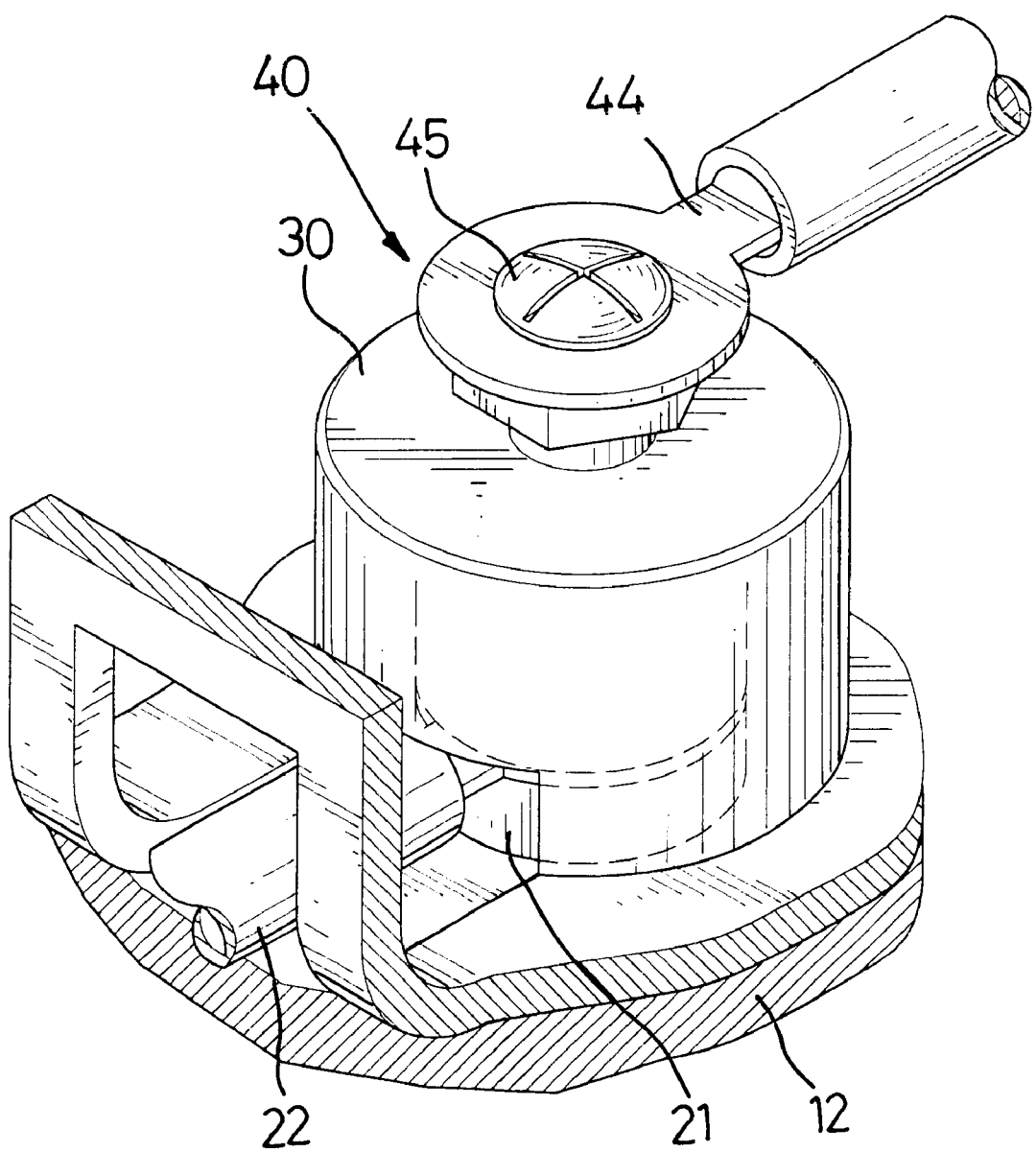
FIG. 2 is an enlarged perspective view of the terminal device for a battery container on an electromobile in accordance with the present invention.
Figure 3:
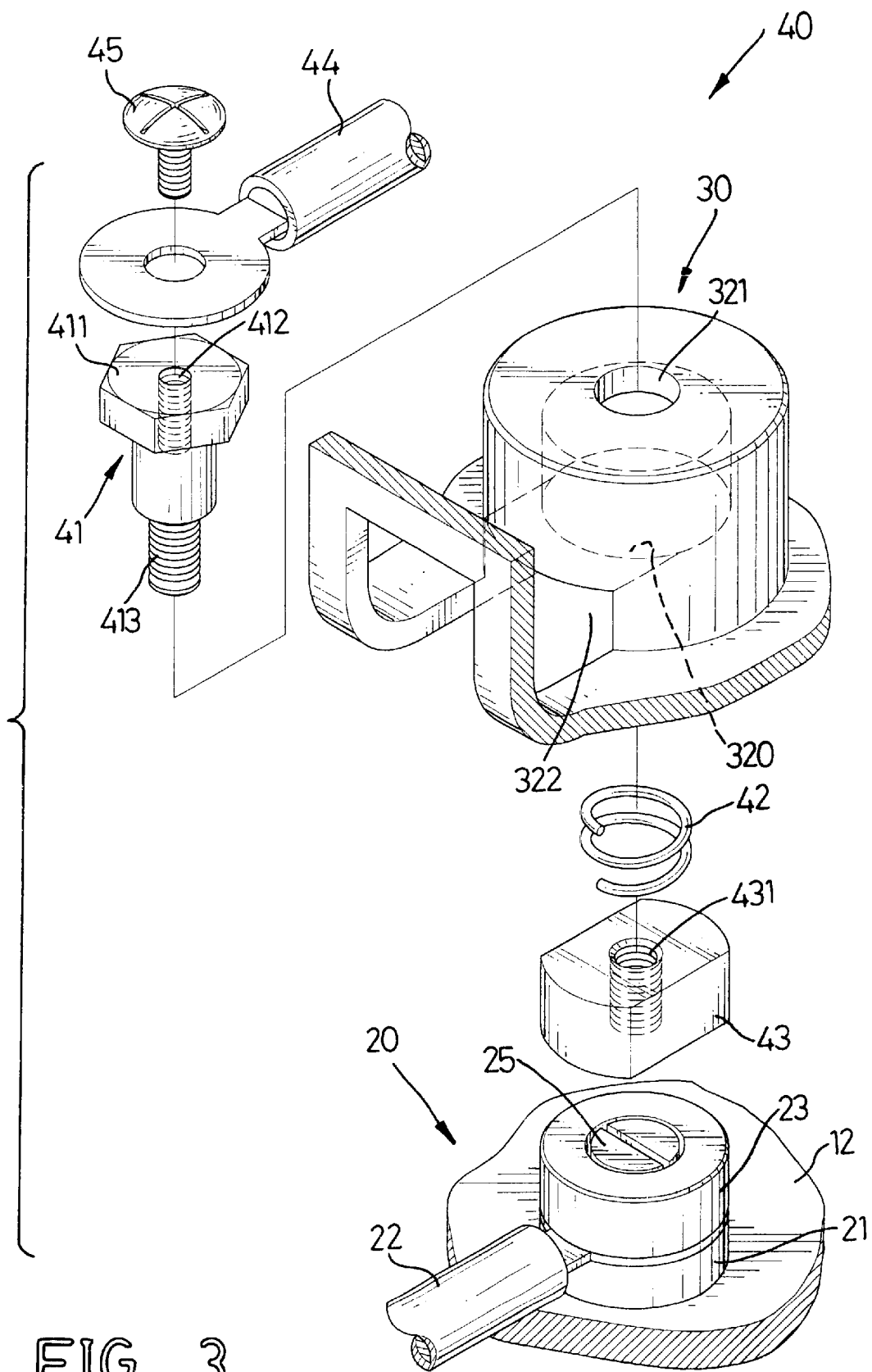
FIG. 3 is an exploded perspective view of the terminal device in FIG. 2.

With reference to FIGS. 1, 2 and 3, a terminal device in accordance with the present invention is adapted to mount on a vehicle body (10) of an electromobile and a battery container (50). The terminal device comprises a body terminal contact (20), a cap (30) and a container terminal contact (40).

The vehicle body (10) has a battery recess (11) with a bottom (12) to hold the battery container (50). Multiple body terminal contacts (20) are mounted on the bottom (12) of the battery recess (11). The battery container (50) has a bottom surface (not numbered) and multiple container terminal contacts (40) mounted on the bottom surface to align with the corresponding body terminal contacts (20). Additionally, the battery container (50) is rechargeable and further has a plug socket (55) formed on the battery container (50) to engage a plug (not shown) connected to a recharge power source.

Figure 4:
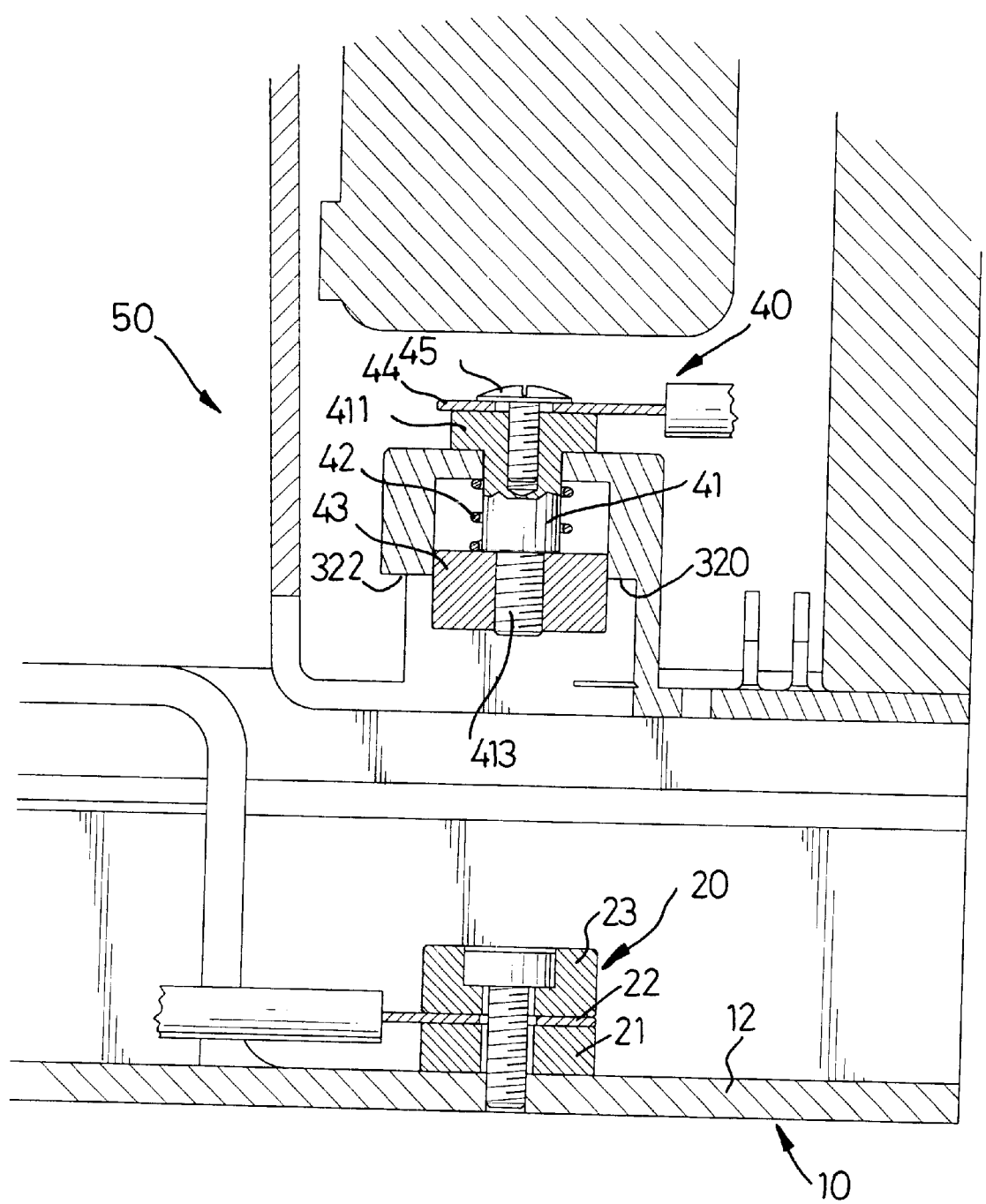
FIG. 4 is an enlarged side plan view in partial section of the terminal device in FIG. 1.

With further reference to FIG. 4, each body terminal contact (20) comprises a cylindrical base (21), a conductive stub (23) and a circuit connector (22). The conductive stub (23) is mounted on the cylindrical base (21), and the circuit connector (22) is clamped between the cylindrical base (21) and the conductive stub (23). The cylindrical base (21), the circuit connector (22) and the conductive stub (23) are connected by a bolt (25). The circuit connector (22) conducts electricity to electric and electronic devices of the electromobile.

The cap (30) is formed in the bottom surface of the battery container (50) and has an internal cavity (not numbered), an opening (320), a top and a central hole (321) defined in the top. Additionally, a cutout (322) is defined in the cap (30) to accommodate the circuit connector (22) when the body terminal contact (20) is combined with the container terminal contact (40).

The container terminal contact (40) is composed of an attachment element (41), a resilient element (42), a conductive block (43), a fastener (45) and a battery connector (44). The attachment element (41) has a stop end and a free end and is a flange bolt with a hexagonal head (411) at the stop end, a shaft (not numbered) and a threaded end (413) at the free end. A threaded hole (412) is defined axially in the attachment element (41) through the hexagonal head (411). The attachment element (41) passes through the central hole (321), and the hexagonal head (411) abuts the top of the cap (30). A threaded hole (431) is defined in the conductive block (43). The threaded end (413) of the attachment element (41) screws into the threaded hole (431). The resilient element (42) such as a coil spring is mounted around the shaft of the attachment element (41) between the top of the cap (30) and the conductive block (43). The battery connector (44) is firmly attached to the hexagonal head (411) by a fastener (45) such as a bolt and is connected to the battery outlet to supply electricity.

Figure 5:
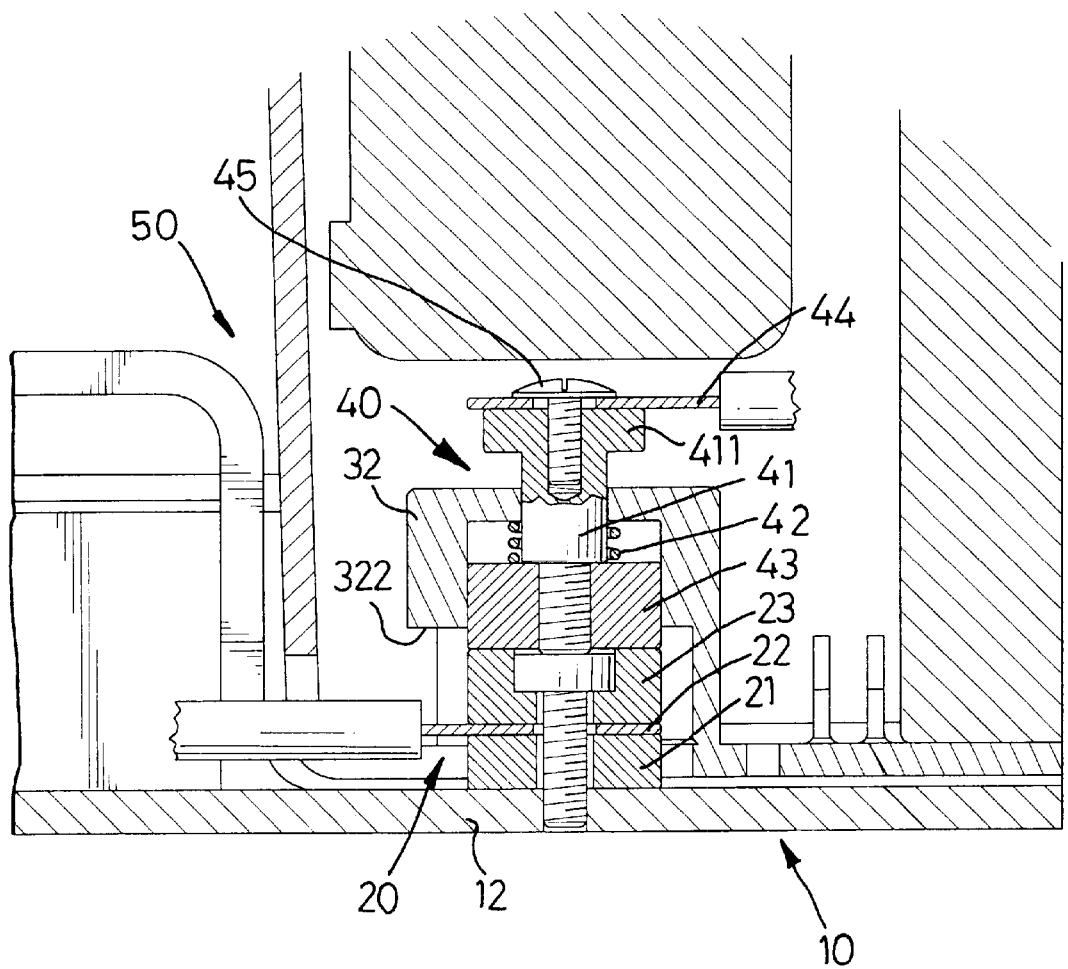
FIG. 5 is an enlarged side plan view in partial section of the terminal device in FIG. 3 with the battery container mounted on the electromobile.

With reference to FIG. 5, the body terminal contacts (20) engage the container terminal contacts (40) when the battery container (50) is mounted in the battery recess (11) of the vehicle body (10). The conductive block (43) of the container terminal contact (40) abuts the conductive stub (23) of the body terminal contact (20) to allow current to flow from the battery to the electromobile. The resilient element (42) is compressed to provide a restitution force to push the conductive block (43) against the conductive stub (23) to ensure an effective electrical contact.

The battery container (50) and the electromobile can be connected easily and quickly by putting the battery container (50) in the battery recess (11) of the vehicle body (10) to engage the body terminal contacts (20) and the container terminal contacts (40). Therefore, the terminal device makes the battery container (50) convenient to use and ensures a good electrical contact between the battery container (50) and the vehicle body (10).

Although the invention has been explained in relation to its preferred embodiment, it is to be understood that many other possible modifications and variations can be made without departing from the spirit and scope of the invention as hereinafter claimed.

What is claimed is:

1. A terminal device for a battery container mounted on an electromobile and the battery container, the terminal device comprising:
   a body terminal contact (20) having:
      a base (21);
      a conductive stub (23) mounted on the base (21); and
      a circuit connector (22) clamped between the base (21) and the conductive stub (23);
   a cap (30) attached on the body terminal contact (20) and having an internal cavity, an opening (320), a top, a central hole (321) defined in the top, and a cutout (322) defined in the cap (30) to accommodate the circuit connector (22); and
   a container terminal contact (40) attached to the cap (30) and having:
      an attachment element (41) with a stop end and a free end that passes through the central hole (321) in the top of the cap (30);
      a conductive block (43) attached to the free end of the attachment element (41);
      a resilient element (42) mounted around the attachment element (41) between the top of the cap (30) and the conductive block (43); and
      a battery connector (44) attached to the stop end of the attachment element (41);
   wherein the resilient element (42) provides a restitution force to press the conductive block (43) against the conductive stub (23) to make an electrical contact.

2. The terminal device as claimed in claim 1, wherein the attachment element (41) is a flange bolt with a head (411) at the stop end to abut the top of the cap (30), a shaft and a threaded end (413) at the free end; and
   the conductive block (43) has a threaded hole (431) defined in the conductive block (43) to engage with the threaded end (413).

3. The terminal device as claimed in claim 2, wherein a threaded hole (412) is formed axially in the head (411) of the attachment element (41); and
   the battery connector (44) is attached to the attachment element (41) by a fastener (45) screwed into the threaded hole (412) in the head (411) of the attachment element (41).

4. The terminal device as claimed in claim 1, wherein the resilient element (42) is a coil spring.

5. The terminal device as claimed in claim 2, wherein the resilient element (42) is a coil spring.

6. The terminal device as claimed in claim 3, wherein the resilient element (42) is a coil spring.

* * * * *